United States Patent [19]
Harper

[11] Patent Number: 5,685,594
[45] Date of Patent: Nov. 11, 1997

[54] TWO-WAY TAILGATE FOR A VEHICLE

[76] Inventor: Frank J. Harper, 28 Maple View Ave., Nassau, N.Y. 12123

[21] Appl. No.: 582,679

[22] Filed: Jan. 4, 1996

[51] Int. Cl.⁶ .................................................. B62D 33/027
[52] U.S. Cl. ........................... 296/51; 296/57.1; 293/117; 292/175; 292/DIG. 29
[58] Field of Search ................................ 296/50, 51, 57.1; 293/117; 292/167, 171, 175, DIG. 29

[56] References Cited

U.S. PATENT DOCUMENTS

| | | | |
|---|---|---|---|
| 1,249,472 | 12/1917 | Painter et al. | 296/167 |
| 1,375,388 | 4/1921 | Haralson | 296/167 |
| 2,506,849 | 5/1950 | Winterton | 296/51 |
| 2,806,735 | 9/1957 | Smith . | |
| 2,821,431 | 1/1958 | Crompton | 296/57.1 |
| 3,155,203 | 11/1964 | Kappen . | |
| 3,309,133 | 3/1967 | Butler . | |
| 3,400,961 | 9/1968 | Koch et al. | 296/50 |
| 3,544,153 | 12/1970 | Galbreath et al. . | |
| 3,912,326 | 10/1975 | Tass . | |
| 4,634,163 | 1/1987 | Bundy et al. | 296/117 |
| 5,048,878 | 9/1991 | Takeshita et al. | 296/171 |
| 5,232,260 | 8/1993 | Lippard . | |

FOREIGN PATENT DOCUMENTS 594799   6/1959   Italy ................................... 292/167

*Primary Examiner*—Gary C. Hoge
*Attorney, Agent, or Firm*—Schmeiser, Olsen & Watts

[57] ABSTRACT

A tailgate for a truck that may be opened about two different axes at the same time is disclosed. A first tailgate portion of the gate rotates about a horizontal axis onto which heavy or long materials may be more readily loaded while a second tailgate portion rotates about a vertical axis for easy access to the forward-most portion of the bed. Additionally, the tailgate addition may include an extended step plate to allow the operator to step into the bed of the truck more readily.

16 Claims, 2 Drawing Sheets

*FIG. 4*
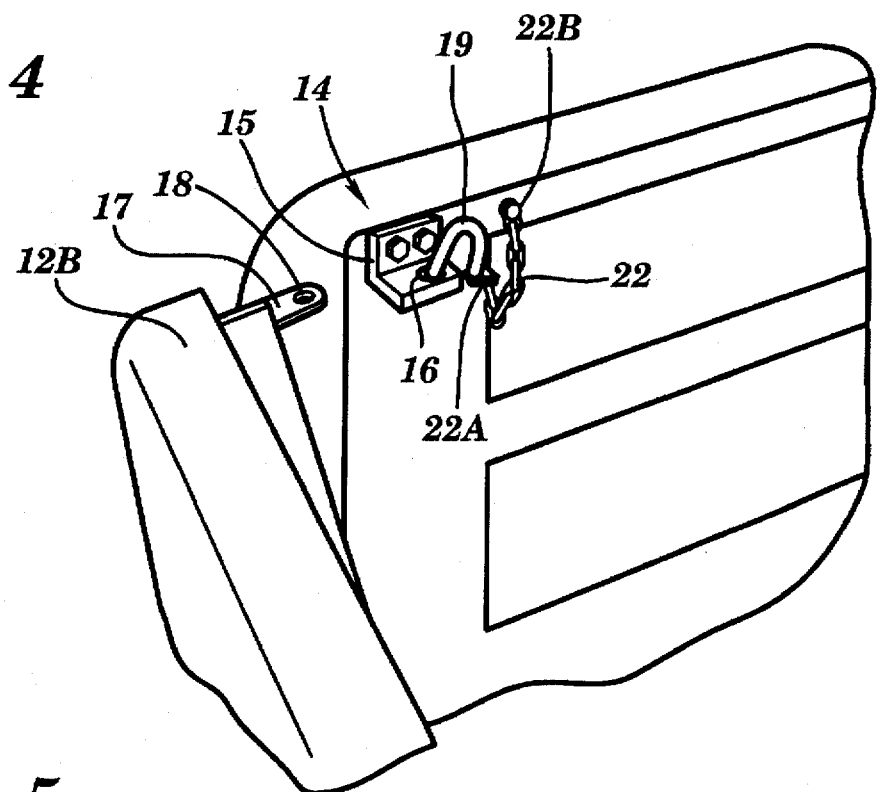
*FIG. 5*
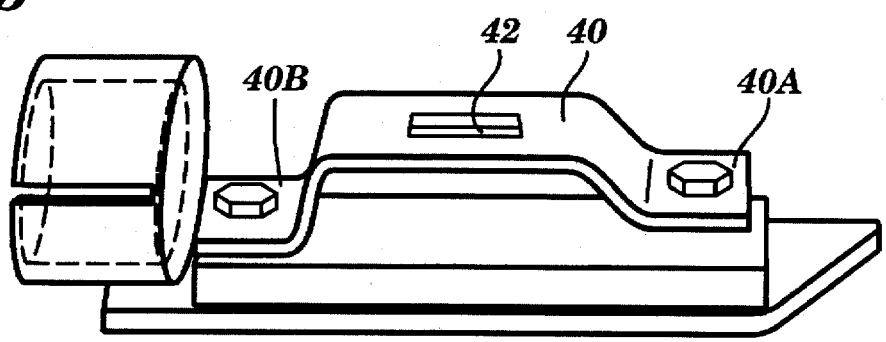
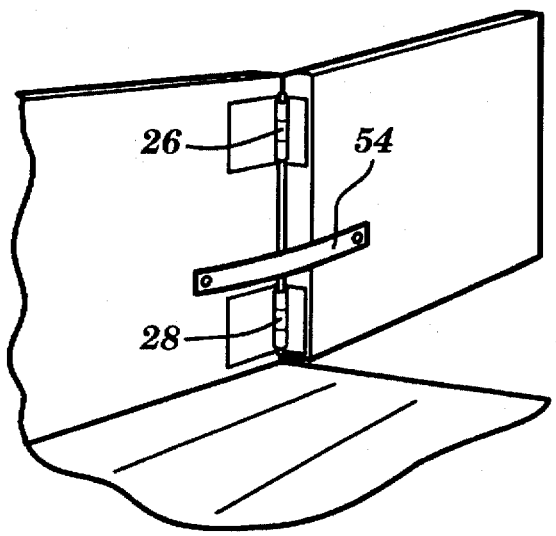
*FIG. 6*

TWO-WAY TAILGATE FOR A VEHICLE

FIELD OF THE INVENTION

This invention relates generally to vehicle gates. More specifically, this invention is a tailgate for a truck that may be opened in two different directions at the same time.

BACKGROUND OF THE INVENTION

Conventional tailgates for vehicles that rotate about both a horizontal and a vertical axis are arranged for either a closed vertical orientation to permit closure and enclosing of a bed, an open vertical orientation to allow access to the bed without having to reach over the gate, and an open horizontal orientation to permit loading, when in the horizontal orientation the tailgate projects rearwardly from the back of the vehicle.

Heretofore, various tailgate assemblies have been developed. For example, U.S. Pat. No. 5,232,260 to Lippard, issued Aug. 3, 1995, discloses an alternative tailgate having an upper half and a lower half for aerodynamic purposes. Each half rotates about a horizontal axis along the upper and lower edges of the truck bed, so that the bed may be closed, the top half opened to permit for airfoil orientation, or the bottom half opened to a position against the floor of the bed to permit airflow therethrough. This arrangement does not, however, allow the operator to open the gate to a second vertical orientation, and therefore any person wishing to obtain an object from the rear of the truck would be forced to climb over the tailgate, which often leads to the operator knocking his or her shins into the top of the tailgate, causing temporary pain and possibly bruising the shin area of the operator. Other patents relating to the aerodynamics of the truck include: U.S. Pat. Nos. 4,867,499; 4,750,777; 4,861,589; and 4,790,589.

Other problems associated with access to the bed of the vehicle have led to other options. U.S. Pat. No. 2,806,735 to Smith, issued Sep. 15, 1957, teaches a universal opening tailgate. The four corners of the tailgate are each two-way hinges so that the gate may be opened from the top, the bottom, or either side. This offers the advantages of increased access, but does not allow the operator to slidably load objects into the bed or place long objects therein and then still have easy access into the rest of the bed. Other gates allowing at least two-way access into the bed are disclosed in U.S. Pat. Nos. 3,544,153 to Galbreath et al., 3,912,326 to Tass, 3,309,133 to Butler, and 3,155,203 to Kappen.

The above related art summaries are merely representative of portions of the inventions disclosed in each reference. In no instance should these summaries substitute for a thorough reading of each individual reference. All the above references are hereby incorporated by reference.

As is shown by the related art references, none of these patents allow the gate to be opened about two different axes at the same time. Therefore, only one possible access route to the bed of the vehicle is open at any time. Occasionally, the need arises for heavy objects to be slidably loaded onto the bed of the vehicle from the rear while still allowing the operator to have easy access to the forward-most portion of the bed, near the cab or driver's seat.

SUMMARY OF THE INVENTION

The present invention provides a means for two-way access to the bed of the vehicle at the same time. By providing a split tailgate having two independent axes of rotation, the present invention allows the operator to open a second tailgate portion of the gate about the vertical axis for easy access to the forward-most portion of the bed while also providing a first tailgate portion of the gate, onto which heavy or long materials may be more readily loaded. Additionally, the tailgate addition may include an extended step plate to allow the operator to step into the bed of the truck more readily.

Accordingly, it is an advantage of the present invention to provide a tailgate for a vehicle that is capable of opening in two directions at the same time.

It is a further advantage of the present invention to provide an enhanced step plate for stepping into the bed of the vehicle.

BRIEF DESCRIPTION OF DRAWINGS

These and other features of the present invention will become more readily apparent upon reading the following detailed description and upon reference to the following drawings in which like numerals refer to like parts and in which:

FIG. 4 is a perspective view of the vertical latch portion of a preferred embodiment of the present invention; and FIG. 5 is a perspective view of the horizontal latch plate and the receiving cup for the horizontal axis.

FIG. 6 is a perspective view of the vertically hinged tailgate portion of the present invention.

DETAILED DESCRIPTION OF THE PREFERRED EMBODIMENTS

Figure 1:
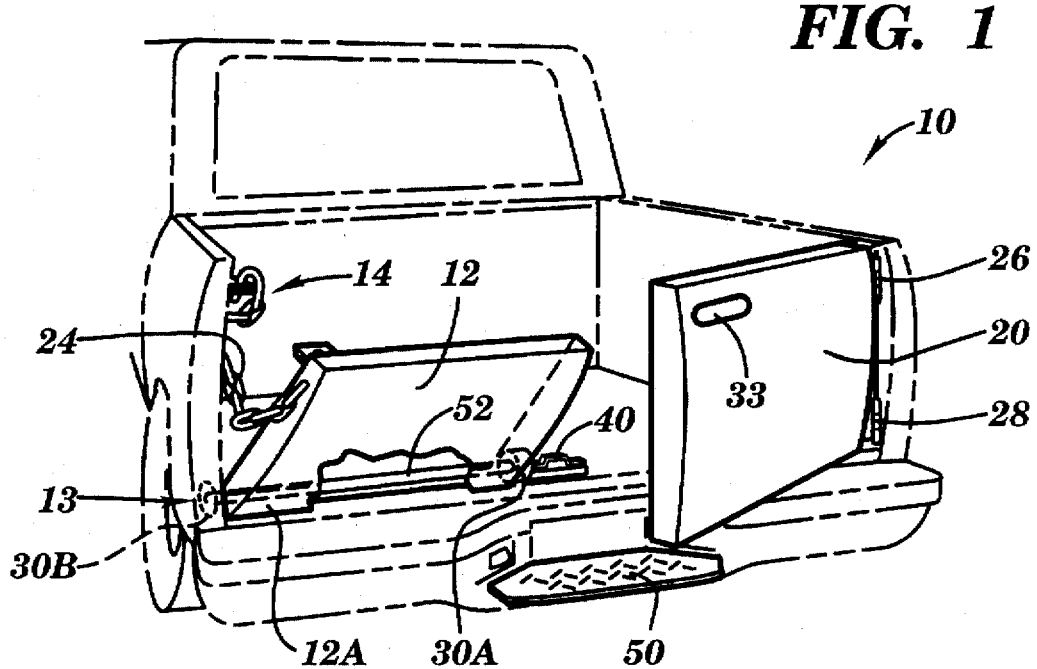
FIG. 1 is a perspective view of a tailgate in accordance with a preferred embodiment of the present invention.

Referring now to the drawings, specifically FIG. 1, there is illustrated a vehicle tailgate, generally designated as 10, in accordance with a preferred embodiment of the present invention. The vehicle tailgate 10 comprises a first tailgate portion 12 and a second tailgate portion 20. Each portion 12, 20 is a hollow, rectangular box made of sheet metal or the like and shaped generally to conform with the rear end of the vehicle.

The first tailgate portion 12 rotates about a horizontal axis 13 which is a piece of tubing 52 that is inserted through a pair of apertures near the bottom edge 12A of the first tailgate portion. The tubing fits into a receptacles 30A, 30B (for 30A, note FIG. 5) at either end, the inner diameters of which are sized so that the tubing fits into the receptacle with adequate space to rotate freely, however, there is not so much space that the door would rattle and shake when travelling. The first tailgate portion 12 is held in the closed position by a first latching device 14.

As shown in FIG. 4, the first latching device 14 comprises a bracket 15, bolted to the inside of the truck bed wall adjacent the upper edge 12B of the first tailgate portion 12, and having a first opening 16 on the part of the bracket 15 that extends away from the truck bed wall, a flange 17 having a second opening 18, bolted to the upper edge 12B of the first tailgate portion 12 in such a manner that the first opening 16 will align with the second opening 18 when the first tailgate portion 12 is in the closed position, and a latching pin 19, which could be a cotter pin, a U-shaped portion of a padlock, or the like, having an outer diameter equal to or less than the inner diameter of the first and second openings 16 and 18, respectively. The latching pin 19 may preferably be attached to a length of small chain 22 at a first end 22A which is in turn attached to the interior of the truck bed at a second end 22B so that the pin is not misplaced or lost.

In order to prevent the first tailgate portion 12 from swinging too far and to provide additional support for long objects while in the open position, a length of large chain 24 is bolted to the interior of the truck bed and the first tailgate portion 12, as is shown in FIG. 1 and commonly known in the art.

The second tailgate portion 20 rotates about a vertical axis which is formed in this case by a pair of hinges 26 and 28, as shown in FIG. 1. The pair of hinges 26, 28 also limit the amount of rotation into the open position. Additionally, a strap of material 54 attached to and extending from the wall of the truck bed to the second tailgate portion as shown in FIG. 6. The strap 54 prevents the second tailgate portion 20 from swinging outwardly as far as it otherwise would if the hinges were the only motion limiting pieces. The second tailgate portion 20 is held in a closed position by means of a second latching device 30.

Figures 2, 3:
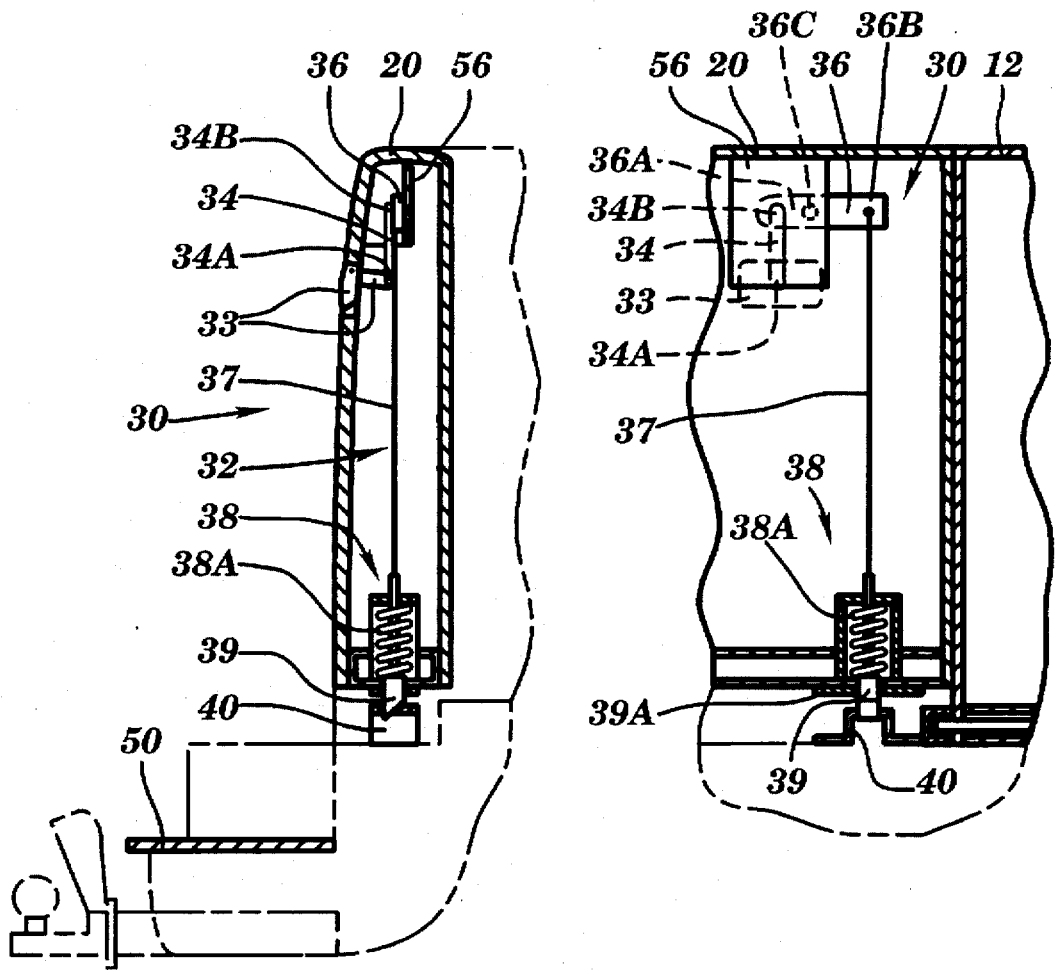
FIG. 2 is a cross-sectional view of the horizontal latch and step plate portions of a preferred embodiment of the present invention.
FIG. 3 is a rear view of the horizontal latch portion of a preferred embodiment of the present invention.

As shown in FIGS. 2 and 3, this second latching device 30 comprises a spring loaded portion 32 in combination with a latch plate 40. As shown in FIG. 5, the latch plate 40 is bolted at either end 40A and 40B to an angle iron 44 which is in turn connected just below the floor of the bed of the truck. The latch plate is raised at the center, the raised portion having a slot 42 to receive the corresponding part of the spring loaded portion 32.

The spring loaded portion 32 comprises a handle 33, a first connecting piece 34, a lever 36, a latch wire or narrow diameter bar rod 37, a spring chamber 38, within which is located a spring 38A, and a catch 39, as depicted in FIGS. 2 and 3. The handle, located in the preferred embodiment at the end of the second tailgate portion opposite the hinges, fits through and is mounted to a front wall of the second tailgate portion 20 and is attached on the back side at approximately the midpoint to the first connecting piece 34 at a lower end 34A thereof. An upper end 34B of the first connecting piece is then attached to a first section 36A of the lever 36.

An alternative handle, adapted from a standard truck gate handle, may be affixed to the first connecting piece 34 at a first handle end which is in turn directly attached to the lever 36. The alternative handle is also coupled to the lever 36 at a second handle end by means of a spring. This alternative handle is readily modified from a standard truck gate handle, which was originally designed to unlatch both ends of a truck gate simultaneously, rather than having a first connecting piece located centrally on the handle.

Regardless of which handle is used, a second section 36B of the lever is attached to the latch wire 37, which extends from the lever 36 through the spring 38A within the spring chamber 38, through the spring plate 39A, to the catch 39. The latch wire 37 may also be a relatively narrow diameter bar rod, for example, a 5/32" round rod of steel may be used. The catch 39 extends through an aperture in a bottom wall of the second tailgate portion 20 and into the slot 42 (note FIG. 5) of the latch plate 40 when the second tailgate portion is in its closed position. The lever 36 is rotatably mounted at a fulcral point 36C to an inner side of a back wall of the second tailgate portion 20 or to an auxiliary panel 56.

The second latching device 30 operates in the following manner: the operator pulls outward on the handle 33, the force on the handle 33 moves the connecting piece 34 downwards, which in turn moves the first section 36A of the lever 36 downwards, the lever rotates at the fulcrum 36C so that the second section 36B of the lever 36 moves upwards, pulling the catch 39 upwards against the pressure of the spring 38A to unlatch the second tailgate portion 20 of the tailgate 10. The end of the catch 39 is cut on a bias so that in closing the tailgate, the catch slides over the latch plate 40 until it is pushed into the slot where it is pushed by the force of the spring 38A.

As long as the second latching device will hold the second tailgate portion in the closed position, any known latching device that basically operates by becoming wedged or otherwise limiting the distance between the two parts when held by both the truck and the second tailgate portion (like as the catch as described above) would suffice. For example, a simple alternative would be to have an L-shaped bar or rod slidably attached to the gate portion. Brackets having holes could be mounted to an interior wall of the second tailgate portion so that they would be projecting therefrom. The L-shaped rod would fit into a hole in the truck bed to hold the door in a closed position. To open the second tailgate portion, one would lift the rod (facilitated by the short end of the L, which may act as a handle) out of the hole in the bed and at which point the second tailgate portion would be free to swing open.

As a further convenience, the first tailgate portion may be slightly smaller than the second tailgate portion, i.e. the gates do not meet at the center of the truck, rather they meet slightly to one side, so that the step plate 50 is still accessible when the first tailgate portion is in an open position (see FIG. 1). This allows the operator to easily step into the rear of the truck while also permitting the use of the truck for carrying long objects that project over the edge of the truck or for loading the truck with objects which are desirable to slide into the bed of the truck.

Additionally, the step plate 50 may be enlarged in order to allow one to place their entire foot on the step for better balance, unlike the customary step. The step plate 50 is not so long as to obscure a ball of a trailer ball mount when used with a conventional under-vehicle receiver hitch (note FIG. 2).

The embodiments disclosed herein have been discussed for the purpose of familiarizing the reader with the novel aspects of the invention. Although preferred embodiments of the invention have been shown, many changes, modifications and substitutions may be made by one having ordinary skill in the art without necessarily departing from the spirit and scope of the invention as described in the following claims.

Accordingly, what is claimed is:

1. A tailgate for a vehicle comprising:
    a first tailgate portion rotatably mounted about a horizontal axis and having an inboard edge;
    a second tailgate portion rotatably mounted about a vertical axis and having an inboard edge;
    a first latching device for securing the first tailgate portion in a closed position;
    a second latching device for securing the second tailgate portion in a closed position; and
    wherein the inboard edges of said first and second tailgate portions are immediately adjacent to each other when in the closed position.

2. The tailgate of claim 1, wherein the horizontal axis is formed by a piece of tubing inserted through a pair of apertures in the first tailgate portion and mounted in a pair of receptacles at either end, and wherein said receptacles are coupled to the truck.

3. The tailgate of claim 1, wherein the vertical axis is formed by a pair of hinges operably coupled to the second tailgate portion and the truck.

4. The tailgate of claim 1, wherein the first latching device includes: a bracket having a first opening coupled to a truck bed wall; a flange having a second opening coupled to the first tailgate portion in a position such that when the first tailgate portion is in the closed position the first and second openings are aligned; and a latching pin for maintaining the first and second tailgate portions in alignment.

5. The tailgate of claim 1, wherein the second latching device includes: a rod slidably engaged with the second tailgate portion; and a hole in the truck for receiving the rod when the second tailgate portion is in the closed position.

6. The tailgate of claim 5, wherein the rod is a catch.

7. The tailgate of claim 6, further comprising:
- a handle for applying a force to open the second tailgate portion of the tailgate;
- a lever for switching the direction of the force;
- a latch wire for connecting the lever to the catch; and
- a spring compartment having a spring around the latch wire and a spring plate below the spring but above the catch, so that the catch will automatically spring back when the second tailgate portion is closed.

8. The tailgate of claim 7, wherein the latch wire is a bar rod.

9. An apparatus comprising a vehicle; and a tailgate mounted on said vehicle, wherein said tailgate includes:
- a first tailgate portion rotatably mounted about a horizontal axis and having an inboard edge;
- a second tailgate portion rotatably mounted about a vertical axis and having an inboard edge;
- a first latching device for securing the first tailgate portion in a closed position;
- a second latching device for securing the second tailgate portion in a closed position; and wherein the inboard edges of said first and second tailgate portions are immediately adjacent to each other when in the closed position.

10. The vehicle of claim 9, wherein the horizontal axis is formed by a piece of tubing inserted through a pair of apertures in the first tailgate portion and mounted in a pair of receptacles at either end, and wherein said receptacles are coupled to the truck.

11. The vehicle of claim 9, wherein the vertical axis is formed by a pair of hinges operably coupled to the second tailgate portion and the truck.

12. The vehicle of claim 9, wherein the first latching device comprises, in combination: a bracket having a first opening coupled to a truck bed wall; a flange having a second opening coupled to the first tailgate portion in a position such that when the first tailgate portion is in the closed position the first and second openings are aligned; and a latching pin for maintaining the first and second tailgate portions in alignment.

13. The vehicle of claim 9, wherein the second latching device comprises, in combination: a rod slidably engaged with the second tailgate portion; and a hole in the truck for receiving the rod when the second tailgate portion is in the closed position.

14. The vehicle of claim 13, wherein the rod is a catch.

15. The vehicle of claim 14, further comprising:
- a handle for applying a force to open the second tailgate portion of the tailgate;
- a lever for switching the direction of the force;
- a connecting piece for connecting the handle to the lever;
- a wire for connecting the lever to the catch; and
- a spring compartment having a spring around the wire and a spring plate below the spring but above the catch, so that the catch will automatically spring back when the door is closed.

16. The vehicle of claim 9, further comprising an extended step plate.

* * * * *